(12) United States Patent
Chapman et al.

(10) Patent No.: US 11,049,285 B2
(45) Date of Patent: Jun. 29, 2021

(54) MEDIA CONTENT VALIDATION USING GEOMETRICALLY ENCODED METADATA

(71) Applicant: Disney Enterprises, Inc., Burbank, CA (US)

(72) Inventors: Steven M. Chapman, Newbury Park, CA (US); Todd P. Swanson, Agoura Hills, CA (US); Mehul Patel, Stevenson Ranch, CA (US); Joseph Popp, Cerritos, CA (US); Ty Popko, Pacoima, CA (US)

(73) Assignee: Disney Enterprises, Inc., Burbank, CA (US)

( * ) Notice: Subject to any disclaimer, the term of this patent is extended or adjusted under 35 U.S.C. 154(b) by 90 days.

(21) Appl. No.: 16/449,062

(22) Filed: Jun. 21, 2019

(65) Prior Publication Data

US 2020/0402264 A1 Dec. 24, 2020

(51) Int. Cl.
*G06T 9/00* (2006.01)
*G06F 21/10* (2013.01)
(Continued)

(52) U.S. Cl.
CPC .............. *G06T 9/001* (2013.01); *G06F 21/10* (2013.01); *G06T 17/20* (2013.01); *H04N 19/20* (2014.11); *H04N 19/46* (2014.11)

(58) Field of Classification Search
CPC ......... H04N 19/20; G06F 21/10; G06T 17/20; G06T 9/001
See application file for complete search history.

(56) References Cited

U.S. PATENT DOCUMENTS

| 6,201,881 | B1 | 3/2001 | Masuda |
| 8,219,817 | B2 * | 7/2012 | Filreis .................. H04L 9/3247 |
| | | | 713/176 |

(Continued)

FOREIGN PATENT DOCUMENTS

| CN | 105398055 | 6/2018 |
| WO | WO 20190141 | 1/2019 |

OTHER PUBLICATIONS

Hedberg, et al. "Embedding X.509 Digital Certificates in Three-Dimensional Models for Authentication, Authorization, and Traceability of Product Data," Comput Ing Sci Eng. Mar. 2017. pp. 1-35.

(Continued)

*Primary Examiner* — Santiago Garcia
(74) *Attorney, Agent, or Firm* — Farjami & Farjami LLP

(57) ABSTRACT

According to one implementation, a system for validating media content includes a computing platform having a hardware processor and a system memory storing a media content validation software code. The hardware processor is configured to execute the media content validation software code to search the media content for a geometrically encoded metadata structure. When the geometrically encoded metadata structure is detected, the hardware processor is further configured to execute the media content validation software code to identify an original three-dimensional (3D) geometry of the detected geometrically encoded metadata structure, to extract metadata from the detected geometrically encoded metadata structure, decode the metadata extracted from the detected geometrically encoded metadata structure based on the identified original 3D geometry, and obtain a validation status of the media content based on the decoded metadata.

16 Claims, 5 Drawing Sheets

(51) Int. Cl.
*G06T 17/20* (2006.01)
*H04N 19/20* (2014.01)
*H04N 19/46* (2014.01)

(56) References Cited

U.S. PATENT DOCUMENTS

| | | | |
|---|---|---|---|
| 9,167,176 | B2 | 10/2015 | Winter |
| 9,872,056 | B1 * | 1/2018 | Zamaraiev ........... H04N 13/161 |
| 10,154,275 | B2 | 12/2018 | Malone |
| 10,499,097 | B2 * | 12/2019 | Zamaraiev ........... H04N 13/161 |
| 2009/0040216 | A1 * | 2/2009 | Ishiyama ............... H04N 19/27 345/419 |
| 2015/0074413 | A1 * | 3/2015 | Hao ........................ G06F 21/10 713/176 |
| 2017/0069056 | A1 * | 3/2017 | Sachs ................. H04N 5/23219 |
| 2017/0242983 | A1 * | 8/2017 | Adams .................... G06F 21/10 |
| 2018/0176619 | A1 * | 6/2018 | Zamaraiev ............. G06F 21/10 |
| 2018/0357741 | A1 | 12/2018 | Joye |
| 2018/0365395 | A1 * | 12/2018 | Lan .................... G06F 21/6218 |
| 2019/0215486 | A1 * | 7/2019 | Venshtain ............. H04N 5/232 |
| 2020/0151952 | A1 * | 5/2020 | Aksit ................... G06N 3/0454 |
| 2020/0226792 | A1 * | 7/2020 | Wang ....................... G06T 9/00 |

OTHER PUBLICATIONS

Panitz, et al. "Digital Preservation of Architectural 3D Data," *IGeLU Conference*. Oxford, Sep. 2014. pp. 1-15.
Biella, Daniel, et al. "Crowdsourcing and Co-curation in Virtual Museums: A Practice-driven Approach," *Journal of Universal Computer Science*. vol. 22, No. 10, 2016. pp. 1-21.

* cited by examiner

| 0 | <NUL> | 32 | <SPC> | 64 | @ | 96 | ` | 128 | Ä | 160 | † | 192 | ¿ | 224 | ‡ |
|---|---|---|---|---|---|---|---|---|---|---|---|---|---|---|---|
| 1 | <SOH> | 33 | ! | 65 | A | 97 | a | 129 | Å | 161 | ° | 193 | ¡ | 225 | · |
| 2 | <STX> | 34 | " | 66 | B | 98 | b | 130 | Ç | 162 | ¢ | 194 | ¬ | 226 | ‚ |
| 3 | <ETX> | 35 | # | 67 | C | 99 | c | 131 | É | 163 | £ | 195 | √ | 227 | „ |
| 4 | <EOT> | 36 | $ | 68 | D | 100 | d | 132 | Ñ | 164 | § | 196 | ƒ | 228 | ‰ |
| 5 | <ENQ> | 37 | % | 69 | E | 101 | e | 133 | Ö | 165 | • | 197 | ≈ | 229 | Â |
| 6 | <ACK> | 38 | & | 70 | F | 102 | f | 134 | Ü | 166 | ¶ | 198 | Δ | 230 | Ê |
| 7 | <BEL> | 39 | ' | 71 | G | 103 | g | 135 | á | 167 | ß | 199 | « | 231 | Á |
| 8 | <BS> | 40 | ( | 72 | H | 104 | h | 136 | à | 168 | ® | 200 | » | 232 | Ë |
| 9 | <TAB> | 41 | ) | 73 | I | 105 | i | 137 | â | 169 | © | 201 | … | 233 | È |
| 10 | <LF> | 42 | * | 74 | J | 106 | j | 138 | ä | 170 | ™ | 202 |   | 234 | Í |
| 11 | <VT> | 43 | + | 75 | K | 107 | k | 139 | ã | 171 | ´ | 203 | À | 235 | Î |
| 12 | <FF> | 44 | , | 76 | L | 108 | l | 140 | å | 172 | ¨ | 204 | Ã | 236 | Ï |
| 13 | <CR> | 45 | - | 77 | M | 109 | m | 141 | ç | 173 | ≠ | 205 | Õ | 237 | Ì |
| 14 | <SO> | 46 | . | 78 | N | 110 | n | 142 | é | 174 | Æ | 206 | Œ | 238 | Ó |
| 15 | <SI> | 47 | / | 79 | O | 111 | o | 143 | è | 175 | Ø | 207 | œ | 239 | Ô |
| 16 | <DLE> | 48 | 0 | 80 | P | 112 | p | 144 | ê | 176 | ∞ | 208 | – | 240 |  |
| 17 | <DC1> | 49 | 1 | 81 | Q | 113 | q | 145 | ë | 177 | ± | 209 | — | 241 | Ò |
| 18 | <DC2> | 50 | 2 | 82 | R | 114 | r | 146 | í | 178 | ≤ | 210 | " | 242 | Ú |
| 19 | <DC3> | 51 | 3 | 83 | S | 115 | s | 147 | ì | 179 | ≥ | 211 | " | 243 | Û |
| 20 | <DC4> | 52 | 4 | 84 | T | 116 | t | 148 | î | 180 | ¥ | 212 | ' | 244 | Ù |
| 21 | <NAK> | 53 | 5 | 85 | U | 117 | u | 149 | ï | 181 | µ | 213 | ' | 245 | ı |
| 22 | <SYN> | 54 | 6 | 86 | V | 118 | v | 150 | ñ | 182 | ∂ | 214 | ÷ | 246 | ˆ |
| 23 | <ETB> | 55 | 7 | 87 | W | 119 | w | 151 | ó | 183 | Σ | 215 | ◊ | 247 | ˜ |
| 24 | <CAN> | 56 | 8 | 88 | X | 120 | x | 152 | ò | 184 | Π | 216 | ÿ | 248 | ¯ |
| 25 | <EM> | 57 | 9 | 89 | Y | 121 | y | 153 | ô | 185 | π | 217 | Ÿ | 249 | ˘ |
| 26 | <SUB> | 58 | : | 90 | Z | 122 | z | 154 | ö | 186 | ∫ | 218 | / | 250 | ˙ |
| 27 | <ESC> | 59 | ; | 91 | [ | 123 | { | 155 | õ | 187 | ª | 219 | € | 251 | ˚ |
| 28 | <FS> | 60 | < | 92 | \ | 124 | | | 156 | ú | 188 | º | 220 | ‹ | 252 | ¸ |
| 29 | <GS> | 61 | = | 93 | ] | 125 | } | 157 | ù | 189 | Ω | 221 | › | 253 | ˝ |
| 30 | <RS> | 62 | > | 94 | ^ | 126 | ~ | 158 | û | 190 | æ | 222 | fi | 254 | ˛ |
| 31 | <US> | 63 | ? | 95 | _ | 127 | <DEL> | 159 | ü | 191 | ø | 223 | fl | 255 | ˇ |

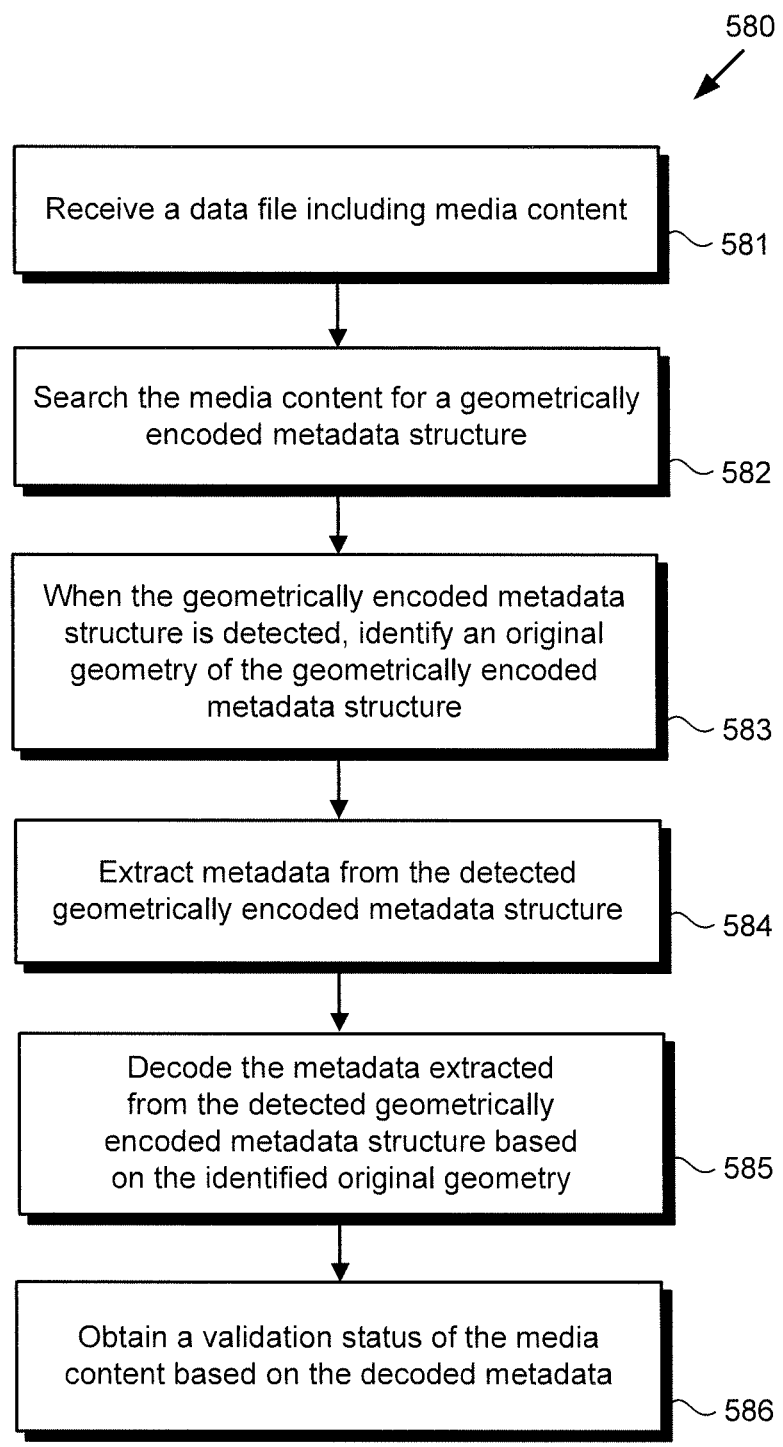

US 11,049,285 B2

MEDIA CONTENT VALIDATION USING GEOMETRICALLY ENCODED METADATA

BACKGROUND

Media content including three-dimensional (3D) data structures, such as 3D models, for example, tend to lose metadata information when utilized in model manipulation software applications. This is because conventional media file transfer techniques rely on format-specific metadata that does not survive conversion to a different format. For example, a 3D model formatted for AUTOCAD® will typically lose all metadata information when converted to virtual reality (VR), 3D printing, or animation formats.

The metadata lost during file conversion may identify the author of the media content, its version, its owners and/or licensees, its storage and transfer history, and other information determining its chain-of-custody, validity, and eligibility for use in movies, television, or Internet based distribution. Without that metadata information, unauthorized or lower quality content may inadvertently be used in place of original media content or authorized copies of that original content approved for use. Moreover, media content approved for distribution through some channels but not others may be improperly distributed in violation of contractual agreement, thereby subjecting the content distributor to legal jeopardy.

SUMMARY

There are provided systems and methods for validating media content using geometrically encoded metadata, substantially as shown in and/or described in connection with at least one of the figures, and as set forth more completely in the claims.

BRIEF DESCRIPTION OF THE DRAWINGS

FIG. 4 shows an American Standard Code for Information Interchange (ASCII) table used as an exemplary reference table for encoding and decoding a geometrically encoded metadata structure, according to one implementation; and FIG. 5 shows a flowchart presenting an exemplary method for use by a system for validating media content, according to one implementation.

DETAILED DESCRIPTION

Figure 1:
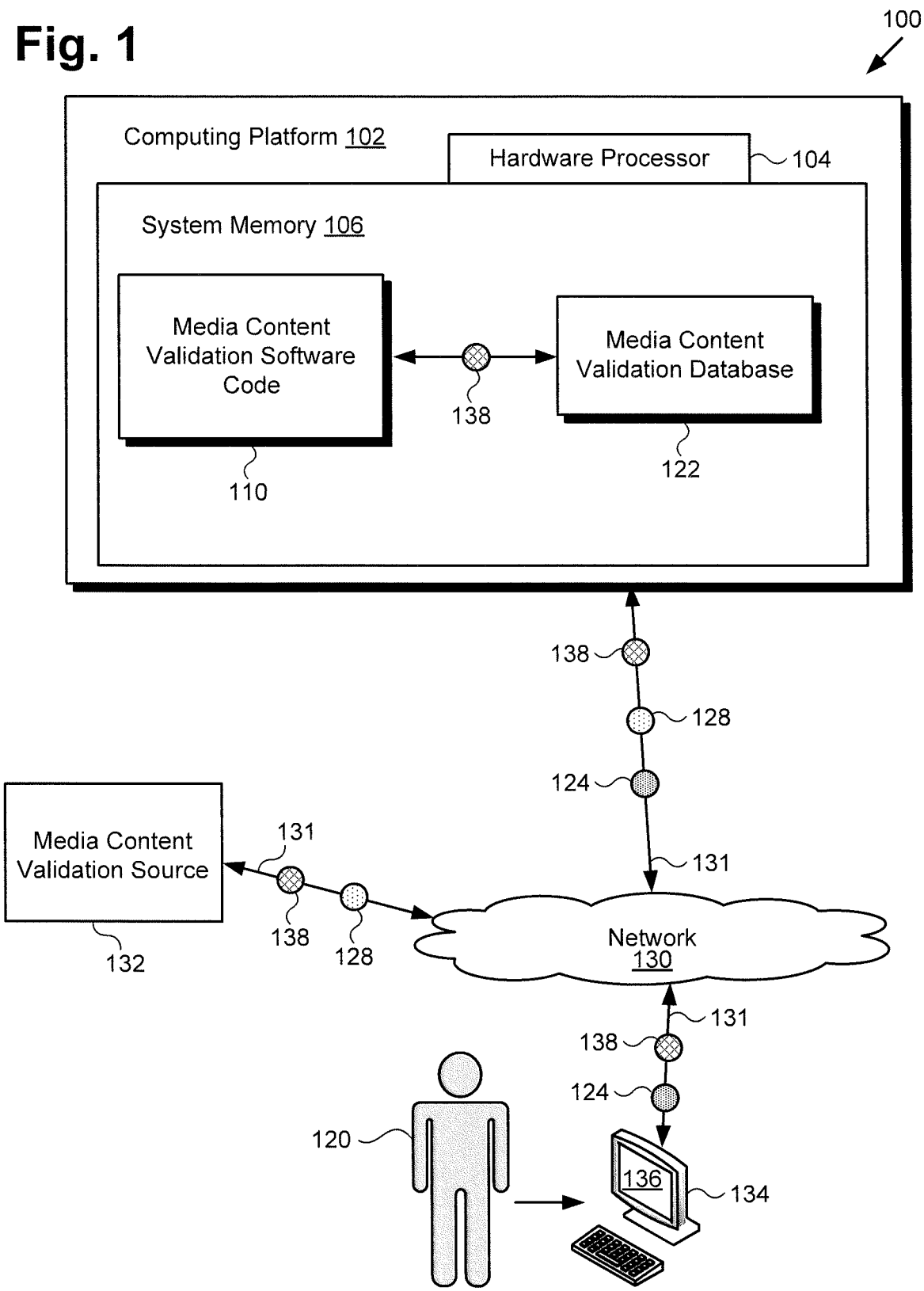
FIG. 1 shows a diagram of an exemplary system for validating media content, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses automated systems and methods for validating media content that overcome the drawbacks and deficiencies in the conventional art. As stated above, media content including three-dimensional (3D) data structures, such as 3D models, for example, tend to lose metadata information when utilized in a variety of model manipulation software applications. As further stated above, this is because conventional media file transfer techniques rely on format-specific metadata that does not survive conversion to a different format. For example, a 3D model formatted for AUTOCAD® will typically lose all metadata information when converted to virtual reality (VR), 3D printing, or animation formats.

The metadata lost during file conversion may identify the author of the media content, its version, its owners and/or licensees, its storage and transfer history, and other information determining its chain-of-custody, validity, and eligibility for use in movies, television, or Internet based distribution. The loss of such metadata may lead to one or more of a number of undesirable results. For example, unauthorized or lower quality content may inadvertently be used in place of original media content or authorized copies of that original content approved for use. Moreover, media content approved for distribution through some channels but not others may be improperly distributed in violation of contractual agreement, thereby subjecting the content distributor to legal jeopardy.

By contrast, in one solution disclosed by the present application, metadata is carried by a geometrically encoded metadata structure included in media content. That geometrically encoded metadata structure may be deformed or otherwise manipulated concurrently with deformation or manipulation of the media content during file conversion. According to the present inventive concepts, when such a geometrically encoded metadata structure is detected in media content, the original 3D geometry of the geometrically encoded metadata structure is identified, metadata is extracted from it, and that metadata is decoded based on the original 3D geometry of the geometrically encoded metadata structure. The validation status of the media content may then advantageously be obtained based on the decoded metadata.

It is noted that, as used in the present application, the terms "automation," "automated", and "automating" refer to systems and processes that do not require human intervention. Although, in some implementations, a human editor or annotator may review media content metadata extracted and decoded by the automated media content validation processes described herein, that human involvement is optional. Thus, validation of media content by the systems and methods described in the present application may be performed under the control of the hardware processing components executing them.

FIG. 1 shows a diagram of an exemplary system for validating media content, according to one implementation. System 100 includes computing platform 102 having hardware processor 104, and system memory 106 implemented as a non-transitory storage device. According to the exemplary implementation shown in FIG. 1, system memory 106 stores media content validation software code 110 and optional media content validation database 122.

As shown in FIG. 1, system 100 is utilized within a use environment including communication network 130, user 120 utilizing user system 134 having display 136, media content 124, and media content validation source 132 providing validation status 138 of media content 124. Also shown in FIG. 1 are network communication links 131 and decoded metadata 128 that is based on metadata extracted from a geometrically encoded metadata structure included in media content 124 (geometrically encoded metadata structure not shown in FIG. 1).

Media content 124 may include any of a wide variety of content types, such as digital images, audio content, audio-visual content, an electronic book or document (e-book or e-document), or a data structure, to name a few examples. In some implementations, media content 124 may include a 3D data structure, such as a 3D model. For example, media content 124 may include a 3D model of an animated character, or a 3D representation of a living person or historical figure. Alternatively, media content 124 may be a 3D model of an object such as a costume or prop used in a movie or television (TV) programming content. As yet another alternative, media content 124 may include a 3D model of an edifice such as a building or monument, or a 3D model of a vehicle, such as a wheeled vehicle, a track driven vehicle, a watercraft, an aircraft, or a spacecraft.

It is noted that, although the present application refers to media content validation software code 110 and optional media content validation database 122 as being stored in system memory 106 for conceptual clarity, more generally, system memory 106 may take the form of any computer-readable non-transitory storage medium. The expression "computer-readable non-transitory storage medium," as used in the present application, refers to any medium, excluding a carrier wave or other transitory signal that provides instructions to a hardware processor of a computing platform, such as hardware processor 104 of computing platform 102. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

It is further noted that although FIG. 1 depicts media content validation software code 110 and optional media content validation database 122 as being mutually co-located in system memory 106, that representation is also merely provided as an aid to conceptual clarity. More generally, system 100 may include one or more computing platforms, such as computer servers for example, which may be co-located, or may form an interactively linked but distributed system, such as a cloud based system, for instance.

For instance, computing platform 102 may correspond to one or more web servers, accessible over a packet-switched network such as the Internet, for example. Alternatively, computing platform 102 may correspond to one or more computer servers supporting a wide area network (WAN), a local area network (LAN), or included in another type of private or limited distribution network. In other words, hardware processor 104 and system memory 106 may correspond to distributed processor and memory resources within system 100. Moreover, media content validation software code 110 and optional media content validation database 122 may be stored remotely from one another within the distributed memory resources of system 100.

It is also noted that although user system 134 is shown as a desktop computer in FIG. 1, that representation is provided merely as an example as well. More generally, user system 134 may be any suitable mobile or stationary computing device or system that implements data processing capabilities sufficient to implement the functionality ascribed to user system 134 herein. For example, in other implementations, user system 134 may take the form of a laptop computer, tablet computer, or smartphone, for example. Furthermore, display 136 of user system 134 may be implemented as a liquid crystal display (LCD), a light-emitting diode (LED) display, an organic light-emitting diode (OLED) display, or another suitable display screen that performs a physical transformation of signals to light.

Figure 2:
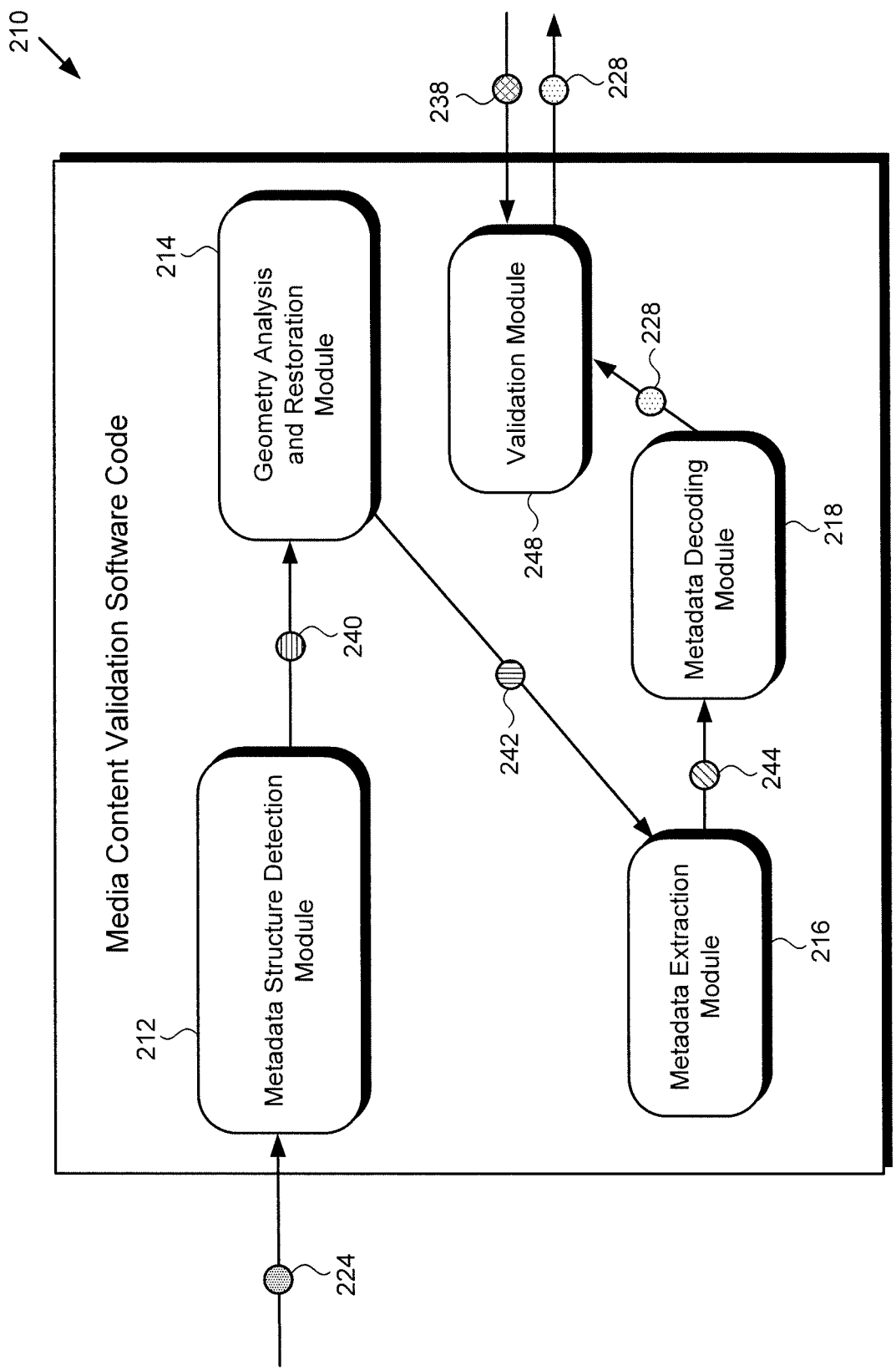
FIG. 2 shows a more detailed exemplary diagram of a media content validation software code suitable for use by the system of FIG. 1, according to one implementation.

FIG. 2 shows a more detailed exemplary diagram of media content validation software code 210 suitable for use by system 100, in FIG. 1, according to one implementation. As shown in FIG. 2, media content validation software code 210 includes metadata structure detection module 212, geometry analysis and restoration module 214, metadata extraction module 216, metadata decoding module 218, and validation module 248. In addition, FIG. 2 shows media content 224 and validation status 238 of media content 224 received by media content validation software code 210, and decoded metadata 228 provided as an output by media content validation software code 210. Also shown in FIG. 2 are geometrically encoded metadata structure 240 included in media content 224, original 3D geometry 242 of geometrically encoded metadata structure 240, and metadata 244 extracted from geometrically encoded metadata structure 240.

Media content validation software code 210 corresponds in general to media content validation software code 110, in FIG. 1, and those corresponding features may share the any of the characteristics attributed to either corresponding feature by the present disclosure. That is to say, like media content validation software code 210, media content validation software code 110 may include features corresponding respectively to metadata structure detection module 212, geometry analysis and restoration module 214, metadata extraction module 216, metadata decoding module 218, and validation module 248.

In addition, media content 224, decoded metadata 228, and validation status 238 of media content 224, in FIG. 2, correspond respectively in general to media content 124, decoded metadata 128, and validation status 138 of media content 124, in FIG. 1. That is to say, media content 224, decoded metadata 228, and validation status 238 of media content 224 may share any of the characteristics attributed to respective media content 124, decoded metadata 128, and validation status 138 of media content 124 by the present disclosure, and vice versa.

Figure 3:
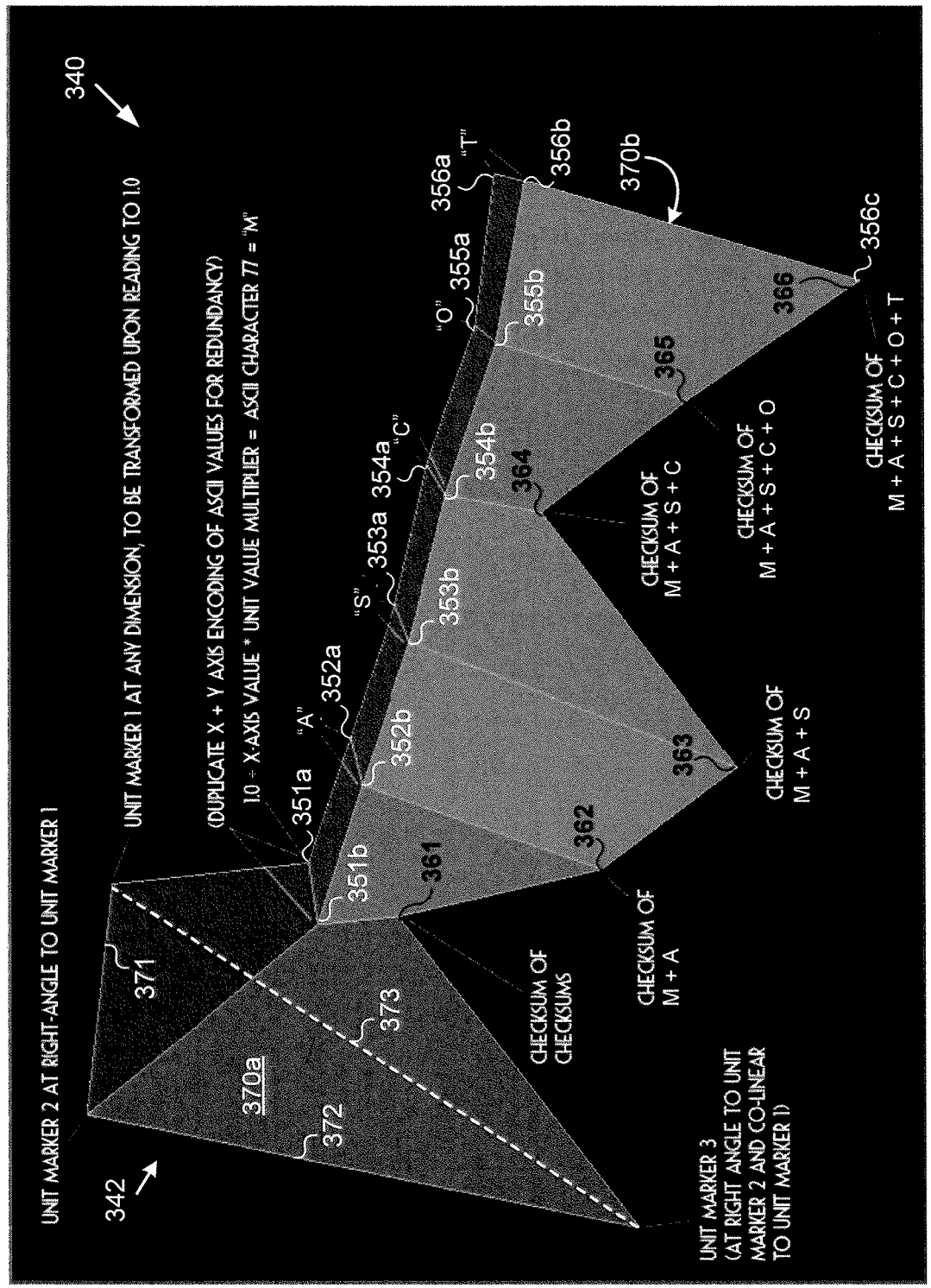
FIG. 3 shows an exemplary diagram of a geometrically encoded metadata structure for use in validating media content, according to one implementation.

FIG. 3 shows an exemplary diagram of geometrically encoded metadata structure 340 for use in validating media content 124/224, according to one implementation. As shown in FIG. 3, exemplary geometrically encoded metadata structure 340 is a 3D structure having original 3D geometry 342 including unit marker 1 (hereinafter "UM1"), unit marker 2 (hereinafter "UM2") perpendicular to UM1, and unit marker 3 (hereinafter "UM3") perpendicular to UM2 and co-linear to UM1. It is noted that the co-linearity of UM1 and UM3 appears distorted in FIG. 3 due to rendering of 3D geometrically encoded metadata structure 340 on the 2D drawing of FIG. 3. It is further noted that UM1, UM2, and UM3 define endcap 370a of geometrically encoded metadata structure 340.

As shown in FIG. 3, edge 371 joins UM1 and UM2, edge 372 joins UM2 and UM3, and edge 373, which is represented by a dashed line because edge 373 is not visible from the perspective shown in FIG. 3, joins UM3 and UM1. FIG. 3 also points to endcap 370*b*, which, like edge 373, is not visible from the perspective shown in FIG. 3. However, it is noted that endcap 370*b* is defined by vertices or points (hereinafter "points") 356*a*, 356*b*, and 356*c*.

In addition to points 356*a*, 356*b*, and 356*c*, FIG. 3 includes points 351*a*, 352*a*, 353*a*, and 354*a* of geometrically encoded metadata structure 340 (points 351*a*, 352*a*, 353*a*, 354*a*, 355*a*, and 356*a* hereinafter referred to collectively as "points 351*a*-356*a*"), as well as points 351*b*, 352*b*, 353*b*, and 354*b* (points 351*b*, 352*b*, 353*b*, 354*b*, 355*b*, and 356*b* hereinafter referred to collectively as "points 351*b*-356*b*"). In addition, FIG. 3 shows checksum 362 of points 351*a*, 351*b*, 352*a*, and 352*b*, checksum 363 of points 351*a*, 351*b*, 352*a*, 352*b*, 353*a*, and 353*b*, checksum 364 of points 351*a*, 351*b*, 352*s*, 352*b*, 353*a*, 353*b*, 354*a*, and 354*b*, checksum 365 of points 351*a*, 351*b*, 352*s*, 352*b*, 353*a*, 353*b*, 354*a*, 354*b*, 355*a*, and 355*b*, and checksum 366 at point 356*c*. Checksum 366 is the checksum of points 351*a*, 351*b*, 352*s*, 352*b*, 353*a*, 353*b*, 354*a*, 354*b*, 355*a*, 355*b*, 356*a*, and 356*b*. Geometrically encoded metadata structure 340 also includes checksum 361 of checksums 362, 363, 364, 365, and 366 (hereinafter "checksum 361 of checksums 362-366").

Geometrically encoded metadata structure 340 having original geometry 342 corresponds in general to geometrically encoded metadata structure 240 having original 3D geometry 242, in FIG. 2, and those corresponding features may share any of the characteristics attributed to either corresponding feature by the present disclosure. That is to say, like geometrically encoded metadata structure 340, geometrically encoded metadata structure 240 may include features corresponding respectively to UM1, UM2, and UM3, endcaps 370*a* and 370*b*, points 351*a*-356*a* and 351*b*-356*b*, checksums 362-366, and checksum 361 of checksums 362-366.

Geometrically encoded metadata structure 240/340 has a manifold continuous outer surface and encodes a right-angle+normal rule that allows media content validation software code 110/210 to detect geometrically encoded metadata structure 240/340 and restore its original 3D geometry 342 if it has been deformed or otherwise modified by animation processes and/or file conversion. That is to say, if geometrically encoded metadata structure 240/340 has been changed geometrically, i.e., deformed, that deformation can be detected and geometrically encoded metadata structure 240/340 can be restored to original 3D geometry 242/342.

Geometrically encoded metadata structure 240/340 is small enough to be contained within the surface bounds of the 3D model or other 3D data structure included in media content 124/224 while advantageously having no effect on the final usage of media content 124/224. That final usage of media content 124/224 may include scene rendering, as-built Building Information Modeling (BIM) planning, engineering processes including computer numerical control (CNC) milling, or 3D printing, for example.

One example of encoding of geometrically encoded metadata structure 240/340 will now be discussed with reference to FIG. 4, which shows American Standard Code for Information Interchange (ASCII) table 400 used as an exemplary reference table for encoding and decoding geometrically encoded metadata structure 240/340. Encoding of geometrically encoded metadata structure 240/340 may include determining normalized numerical values corresponding to each of the characters assigned to points 351*a*-356*a* and also assigned to points 352*a*-356*b* for redundancy, i.e., the respective letters M, A, S, C, O, and T based on ASCII table 400. However, it is emphasized that use of ASCII table 400 is merely exemplary, and one of ordinary skill in the art will readily recognize that other analogous encoding techniques may be used.

Referring to ASCII table 400, in FIG. 4, a normalized numerical value for the letter "M" at point 351*a* in FIG. 3 may be obtained by using the inverse of the number of entries in ASCII table 400, i.e., $\frac{1}{256}$, as a multiplier applied to the ASCII value assigned to the letter "M." Thus, the encoded numerical value corresponding to the letter "M" at point 351*a* is UVM*77=$\frac{1}{256}$*77=0.301, where UVM is a Unit Value Multiplier. The numerical value 0.301 may then be used to provide the dimension for the quadrilateral defined by points 351*a*, 351*b*, 352*a*, and 352*b* that geometrically encodes the letter "M" at points 351*a* and 351*b*.

By analogy, a normalized numerical value for the letter "A" at points 352*a* and 352*b* may be obtained by using $\frac{1}{256}$ as a UVM applied to the ASCII value assigned to the letter "A." Thus, the encoded numerical value corresponding to the letter "A" at point 352*a* is UVM*65=$\frac{1}{256}$*65=0.254. The numerical value 0.254 may be used to provide the dimension for the quadrilateral defined by points 352*a*, 352*b*, 353*a*, and 353*b* that geometrically encodes the letter "A" at points 352*a* and 352*b*, and so forth.

It is noted that in some implementations, it may convenient to define the origin of the 3D space occupied by geometrically encoded metadata structure 240/340 to correspond with UM2 of original 3D geometry 342. With respect to checksums 362-366, and checksum 361 of checksums 362-366, it is noted that checksum 361 of checksums 362-366 at the location (UM3, 1, 0) in original 3D geometry 242/342 is held for processing until each of checksums 362-366 is independently computed. The checksum 361 of checksums 362-366 allows one more level of validation, as this value is correct only if it matches the independently computed checksums 362-366 of all of the metadata characters.

Checksum 362 at location (UM3, 2, 0) in original 3D geometry 242/342 is computed using any one of numerous suitable algorithms, for example, a decimal sum of the numbers assigned to the characters at points 351*a* and 352*a* by ASCII table 400 may be used, for example (77+65)*UVM (or another specified value). By analogy, checksum 363 may be (77+65+68)*UVM, checksum 364 may be (77+65+68+67)*UVM, checksum 365 may be (77+65+68+67+65)*UVM, and checksum 367 may be (77+65+68+67+65+84)*UVM.

In one implementation, metadata 244 is extracted from geometrically encoded metadata structure 240/340 and is decoded based on original 3D geometry 242/342 to produce decoded metadata 128/228 for use in obtaining validation status 138/238 of media content 124/224. For example, decoded metadata 128/228 may include a Uniform Resource Identifier (URI), such as a Uniform Resource Locator (URL), for use in obtaining validation status 138/238 of media content 124/224 from media content validation source 132.

Media content validation source 132 may provide validation status 138/238 in the form of authorship, revision history, descriptive information, ownership, licensing history, and distribution rights, for example. Thus, validation status 138/238 of media content 124/224, when obtained based on metadata extracted from geometrically encoded metadata structure 240/340 and decoded, may be used to confirm that media content 138/238 is suitable for its intended use. For example, where media content 124/224 is intended for distribution over the Internet, validation status 138/238 can be used to confirm that Internet distribution rights for media content are in order. As another example, Moreover, in some implementations, validation status 138/238 may include a link to other database elements such as the original version of media content 124/224 (for such purposes as reverting changes), or to variations of media content 124/224 suitable for specific use cases. For example, validation status 138/238 for media content 124/224 including an architectural model used for Building Information Modeling may include a link to another version of the model tailored to 3D printing or VR applications. In such implementations, validation status 138/238 may be used to confirm that the version of media content 124/224 carrying geometrically encoded metadata structure 240/340 is in a format appropriate to its intended application. Alternatively, or in addition, in those implementations, validation status 138/238 may be used to obtain an original version of media content 124/224, a more current version of that media content, or a version of media content 124/224 formatted for a specific application.

The functionality of system 100 including media content validation software code 110/210 will be further described by reference to FIG. 5 in combination with FIGS. 1, 2, 3, and 4. FIG. 5 shows flowchart 580 presenting an exemplary method for use by a system for validating media content, according to one implementation. With respect to the method outlined in FIG. 5, it is noted that certain details and features have been left out of flowchart 580 in order not to obscure the discussion of the inventive features in the present application.

Referring now to FIG. 5 in combination with FIGS. 1, 2, 3, and 4, flowchart 580 begins with receiving media content 124/224 (action 581). For example, media content 124/224 may be received by system 100 from user 120, via user system 134, communication network 130, and network communication links 131. More specifically, media content 124/224 may be received by media content validation software code 110/210, executed by hardware processor 104.

As noted above, media content 124/224 may include any of a wide variety of content types, such as digital images, audio content, audio-visual content, e-books or e-documents, or a data structure, to name a few examples. As also noted above, in some implementations, media content 124/224 may include a 3D data structure, such as a 3D model of an animated character, a 3D representation of a living person or historical figure, a 3D model of an object such as a costume or prop used in a movie or TV program, a 3D model of an edifice such as a building or monument, or a 3D model of a vehicle.

Flowchart 580 continues with searching media content 124/224 for geometrically encoded metadata structure 240/340 (action 582). In some implementations, action 582 may include searching substantially all of media content 124/224 for the presence of geometrically encoded metadata structure 240/340. However, in some implementations, or in some specific use cases, the searching performed in action 582 may be restricted to a predetermined portion of media content 124/224.

Geometrically encoded metadata structure 240/340 may be isolated via an algorithm that compares an arbitrary point in the object in which geometrically encoded metadata structure 240/340 is included, assuming but not limited to it having no other identifying markers, such as "layer", color, or other features, to all other points in the object in order to find the set(s) of points that are disconnected spatially from the entire dataset, for which geometrically encoded metadata structure 240/340 acts as spatial metadata. Essentially this process, which can be computed with any number of suitable algorithms, divides the points of the object as a whole into two or more subsets of objects by assigning an identifying variable to the starting point and all other points found to be connected to the starting point either directly or by establishing that additional points are connected to other points that have been tested to connect with the starting point. The process can be repeated recursively by incrementing the identifying variable and applying the same process to the set of points that were not identified as having a connection with the starting point. The result should include more than one set of points i.e., multiple disconnected objects. If the outcome is just one set of points identified as being an attached collection, then the process has failed.

Assuming that multiple detached objects have been found, action 582 may include identifying one of them as being likely to be geometrically encoded metadata structure 240/340 based on any number of pre-established parameters unlikely to be part of a common 3D model, and fitting in with the intrinsic parameters of the identifier definition. There may be an exact quantity of points established extrinsically, as part of the metadata specification. Any other objects can thus be eliminated from consideration. There may be other specification rules that will be established, such as, per the example illustration of FIG. 3, having precisely six points (two polygons with three points each) that have three attached neighbor points, the rest having four points. It may be ideal to establish the endcaps 370a and 370b (endcap polygons) as the basis for repairing models that have been "triangulated," i.e., models that have been forced to be deconstructed from quadrilateral-faces into objects being entirely made of triangles, because the endcaps 370a and 370b will have four connections on each point, and any other face will have at least one neighbor connecting to five other points. With the knowledge of which faces are endcaps 370a and 370b, the triangle endcap/quadrilateral identifier face construct needed to read the metadata encoding can be re-established. It is noted that, in order to expedite decoding, a specification that requires certain character(s) be encoded as a header sequence may be established such that erroneous or impossible configurations are ruled out in order to optimize processing.

As a specific example of limited or restricted searching, where media content 124/224 includes a 3D model of an animated character, it may be predetermined that geometrically encoded metadata structure 240/340, when present, is contained within an eye of the animated character. In that use case, action 582 may be limited to searching one or both eyes of the animated character included in media content 124/224 for geometrically encoded metadata structure 240/340. Searching of media content 124/224 for geometrically encoded metadata structure 240/340 may be performed by media content validation software code 110/210, executed by hardware processor 104, and using metadata structure detection module 212.

Flowchart 580 continues with, when geometrically encoded metadata structure 240/340 is detected, identifying original 3D geometry 242/342 of detected geometrically encoded metadata structure 240/340 (action 583). In some use cases, the original 3D geometry of geometrically encoded metadata structure 240/340 may be unaltered, in which cases action 583 corresponds to recognizing the geometry of detected geometrically encoded metadata structure 240/340 as original 3D geometry 242/342. For example, the geometry of geometrically encoded metadata structure 240/340 may be identified as original 3D geometry 242/342 based on comparison of checksums 362-366 and checksum 361 of checksums 362-366 to their respective known values.

In some use cases, however, original 3D geometry 242/342 of geometrically encoded metadata structure 240/340 may have been deformed, either unintentionally during use or as a result of file conversion, or intentionally through editing or manipulation. For example, in some cases, after being created but before being received by system 100 in action 581, media content 124/224 may have been converted from a first data format to a second data format. As a specific example, where media content 124/224 includes a 3D model created using a software application such as Maya®, Auto-CAD®, Houdini®, 3ds MAX®, or SolidWorks®, geometrically encoded metadata structure 240/340 may be deformed when media content 124/224 is manipulated or otherwise processed using another of those software applications before being received by system 100 in action 581.

Where deformation of geometrically encoded metadata structure 240/340 has occurred, action 583 may include restoring original 3D geometry 242/342 of geometrically encoded metadata structure 240/340. For example, restoration of original 3D geometry 242/342 may include moving endcap 370a to the origin in Cartesian space, (0, 0, 0) so that UM2 is located at the origin.

UM1, along with all other points except UM2, may then be transformed via rotation on the origin so that UM1 is posed at a 90° angle to the X-axis and is resting on the Y-intercept co-linear to UM2 and in a positive offset. UM1, along with the points attached to UM1 that are not attached to UM2 or UM3, and rest on the outward-facing polygon's neighbors as defined by the clockwise arrangement of point ordering of the first polygon attached to UM1 not attached to UM2 or UM3, are normalized by scaling geometrically encoded metadata structure 240/340 so that the distance along the Y-Axis of UM1 is 1.0 (out to any specified digits of accuracy) units from the origin at UM2.

UM3 and its child points are rotated along the UM1-UM2 axis to be at a 90° angle to the X-Y plane in the positive Cartesian space. The points of UM3 along with its children should now be coplanar in the X-Z orientation, in other words the point UM3 should be resting at zero in the X and Y-axes, and its attached points along the X-direction should lay coplanar to the X-Z plane intersecting UM2. The distance from UM3 to UM2 should ideally be 1 unit, i.e., (x, y, z)=(0, 0, 1) as it should have maintained its relationship to UM1 as UM1 was scaled to be one unit from UM2. If this is not the case, it is possible that some manner of squash-and-stretch animation has been applied to the model including geometrically encoded metadata structure 240/340 at some point. The points along the X-Axis corresponding to and including UM3 will be scaled to make UM3 be at the location 1.0.

The points connecting to and coplanar with UM1 should now match the points connecting to and coplanar with UM2 because they are meant to be redundant encoding and therefore identical. The initial "n" number of encoded ASCII values can now be read from the initial set of points along and coplanar to UM1. These values are verified to have corresponding checksum values in the plane of points at the same X-offset as any particular character and coplanar+ connected to UM3. It is noted that in some implementations, it may be advantageous or desirable to add an additional reconstruction variable in addition to our example's three-dimensions, or to replace the redundant encoding along UM2 with another value that may be found to aid in reconstruction.

If the values in UM2 do not match the values in UM1 after reconstruction, reprocessing may be attempted using UM1 or UM3 as UM2, i.e., as the (0, 0, 0) origin point, (assuming they have been rotated during deformation). In a situation where geometrically encoded metadata structure 240/340 has been inverted (mirrored) or rotated 180° from the original encoding, reprocessing may be attempted by using the opposite endcap's points as UM2. In another example, reprocessing may be attempted by scaling UM1's children as well as UM2's children until they can be used to accurately compute UM3's checksum (testing for valid data), or by processing only UM1 or UM2 (i.e., one without the other) to see if valid metadata results. Additional transformations via translation or rotation of the points of each character of the children of UM1, UM2, and UM3 may be made in attempts to extract metadata from extremely deformed models, with the potential for success or failure. In this case the potential of placing multiple redundant metadata objects in various non-obtrusive positions (e.g., inside a character) may be examined, and the differential variation of or metadata object's clones may be used to further aid the possible potential of reconstructing the message in cases of extreme modification of the overall object including geometrically encoded metadata structure 240/340.

Identification of original 3D geometry 242/342 of detected geometrically encoded metadata structure 240/340 may be performed by media content validation software code 110/210 executed by hardware processor 104, and using geometry analysis and restoration module 214.

Flowchart 580 continues with extracting metadata 244 from geometrically encoded metadata structure 240/340 (action 584). Metadata 244 may be an encoded metadata, for example. Moreover, metadata 244 may be encoded by original 3D geometry 242/342 of geometrically encoded metadata structure 240/340, which may be a 3D geometry, for example. Extraction of metadata 244 from geometrically encoded metadata structure 240/340 may be performed by media content validation software code 110/210 executed by hardware processor 104, and using metadata extraction module 216.

Flowchart 580 continues with decoding metadata 244 extracted from detected geometrically encoded metadata structure 240/340 based on original 3D geometry 242/342 identified in action 583 (action 585). Decoding of metadata 244 based on original 3D geometry 242/342 of geometrically encoded metadata structure 240/340 may be performed by media content validation software code 110/210, executed by hardware processor 104, and using metadata decoding module 218. For example, metadata decoding module 218 may be configured to translate geometric values included in metadata 242 into decoded metadata 128/228 in the form of descriptive metadata and/or a URI of a repository of descriptive metadata unique to media content 124/224.

Flowchart 580 can conclude with obtaining validation status 138/238 of media content 124/224 based on decoded metadata 128/228 (action 586). In some implementations, hardware processor 104 may execute media content validation software code 110/210 to obtain validation status 138/238 of media content 124/224 using validation module 248. As discussed above, validation status 138/238 may take the form of one or more of authorship, revision history, descriptive information, ownership, licensing history, and distribution rights for media content 124/224, for example. In some implementations, media content validation software code 110/210 may utilize validation module 248 to obtain validation status 138/238 from media content validation database 122 optionally stored by system memory 106. However, and as noted above, in some implementations, decoded metadata 128/228 may include a URI, such as a URL, for use in obtaining validation status 138/238 from a remote source, such as media content validation source 132 accessible via communication network 130.

Media content validation source 132 may provide validation status 138/238 in the form of authorship, revision history, descriptive information, ownership, licensing history, and distribution rights for media content 124/224. Moreover, and as also noted above, in some implementations, validation status 138/238 may include a link to other database elements such as the original version of media content 124/224 (for such purposes as reverting changes), or to variations of media content 124/224 suitable for specific use cases. For example, validation status 138/238 for media content 124/224 including an architectural model used for Building Information Modeling may include a link to another version of the model tailored to 3D printing or VR applications.

In some implementations, user 120 may be authorized to modify validation status 138/238 for media content 124/224 by adding information, deleting information, or updating existing information included in validation status 138/238. In one such implementation, a blockchain protection protocol may be implemented by system 100 to prevent unauthorized or unintentional modification of validation status 138/238 for media content 124/224 when validation status 138/238 is stored in media content validation database 122 of system 100.

Although not included in the exemplary outline provided by flowchart 580, in some implementations, the present method may further include providing validation status 138/238 as an output to user system 134 for rendering on display 136. In those implementations, validation status 138/238 may be output to user system 134 by media content validation software code 110/210, executed by hardware processor 104, and via communication network 130. Furthermore, in one implementation, system 100 may include user system 134, and may utilize user system 134 to render validation status 138/238 of media content 124/224 on display 136. As noted above, display 136 may be implemented as an LCD, an LED display, an OLED display, or any other suitable display screen that performs a physical transformation of signals to light.

Thus, the present application discloses automated systems and methods for validating media content using geometrically encoded metadata. From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system for validating a media content including a three-dimensional (3D) data structure, the system comprising:
   a computing platform including a hardware processor and a system memory;
   a media content validation software code stored in the system memory;
   the hardware processor configured to execute the media content validation software code to:
      detect a geometrically encoded metadata structure contained in the 3D data structure of the media content, wherein the 3D data structure and the geometrically encoded metadata structure are deformed;
      restore an original 3D geometry of the geometrically encoded metadata structure;
      extract a metadata from the geometrically encoded metadata structure;
      decode the metadata based on the original 3D geometry to obtain decoded metadata; and
      obtain a validation status of the media content based on the decoded metadata.

2. The system of claim 1, wherein the decoded metadata includes a Uniform Resource Identifier used in obtaining the validation status of the media content.

3. The system of claim 1, wherein the media content is converted from a first data format to a second data format before detecting the geometrically encoded metadata structure.

4. The system of claim 1, wherein the validation status of the media content is one of an authorship, a revision history, a descriptive information, an ownership, a licensing history of the media content, or distribution rights for the media content.

5. The system of claim 1, wherein the 3D data structure comprises a 3D model.

6. The system of claim 5, wherein the 3D model is a 3D model of an animated character.

7. The system of claim 5, wherein the 3D model is a 3D model of one of a costume or a prop.

8. The system of claim 5, wherein the 3D model is a 3D model of one of a building or a vehicle.

9. A method for use by a system for validating a media content including a three-dimensional (3D) data structure, the system including a computing platform having a hardware processor and a system memory storing a media content validation software code, the method comprising:
   detecting, by the media content validation software code executed by the hardware processor, a geometrically encoded metadata structure contained in the 3D data structure of the media content, wherein the 3D data structure and the geometrically encoded metadata structure are deformed;
   restoring, by the media content validation software code executed by the hardware processor, an original 3D geometry of the geometrically encoded metadata structure;
   extracting, by the media content validation software code executed by the hardware processor, metadata from the geometrically encoded metadata structure;
   decoding, by the media content validation software code executed by the hardware processor, the metadata based on the original 3D geometry to obtain decoded metadata; and
   obtaining, by the media content validation software code executed by the hardware processor, a validation status of the media content based on the decoded metadata.

10. The method of claim 9, wherein the decoded metadata includes a Uniform Resource Identifier used in obtaining the validation status of the media content.

11. The method of claim 9, further comprising:
converting the media content from a first data format to a second data format before detecting the geometrically encoded metadata structure.

12. The method of claim 9, wherein the validation status of the media content is one of an authorship, a revision history, a descriptive information, an ownership, a licensing history of the media content, or distribution rights for the media content.

13. The method of claim 9, wherein the 3D data structure comprises a 3D model.

14. The method of claim 13, wherein the 3D model is a 3D model of an animated character.

15. The method of claim 13, wherein the 3D model is a 3D model of one of a costume or a prop.

16. The method of claim 13, wherein the 3D model is a 3D model of one of a building or a vehicle.

\* \* \* \* \*